United States Patent [19]
Thompson

[11] 3,800,279
[45] Mar. 26, 1974

[54] AUTO ANTI-THEFT SYSTEM

[76] Inventor: Herbert L. Thompson, 4098 E. 143rd St., Cleveland, Ohio 44128

[22] Filed: July 24, 1972

[21] Appl. No.: 274,328

[52] U.S. Cl............. 340/65, 137/598, 180/114, 303/89, 307/10 AT, 340/52 C
[51] Int. Cl............. B60r 25/00, H02g 3/00
[58] Field of Search.... 340/63, 64, 65, 52 C, 244 E; 307/10 AT; 180/114; 188/106 P, 163; 303/89, 84 A, 6 A; 137/598, 112, 487.5

[56] References Cited
UNITED STATES PATENTS

| | | | |
|---|---|---|---|
| 3,155,105 | 11/1964 | Yanna | 137/112 |
| 3,572,472 | 3/1971 | Black | 303/89 |
| 3,656,574 | 4/1972 | Edwards | 303/89 |
| 3,669,210 | 6/1972 | Haefner | 303/89 |
| 3,698,505 | 10/1972 | Webley | 307/10 AT |

Primary Examiner—John W. Caldwell
Assistant Examiner—Joseph E. Nowicki
Attorney, Agent, or Firm—Donnelly, Maky, Renner & Otto

[57] ABSTRACT

An auto anti-theft system or unit characterized in that when the key operated lock switch thereof is momentarily turned to On position, (1) a valve in the unit is actuated to a position blocking communication between the main master cylinder and the brake line leading to the wheel cylinders and opening communication between an auxiliary master cylinder in the unit and the brake line; and (2) the auxiliary master cylinder is actuated to firmly apply the brakes on all four wheels and latched in the brake applying position until the key is reinserted and momentarily turned to Off position whereat a latch member in the unit is actuated to release the auxiliary master and the brakes, and whereat the aforesaid valve is actuated to a position blocking communication between the auxiliary master cylinder and the brake line and opening communication between the main master cylinder and the brake line for normal operation of the hydraulic braking system. The system is further characterized in that it draws battery current only when the lock switch is momentarily turned to On or Off positions from a spring returned neutral position.

The system herein is still further characterized in that when it is in the On position a switch in the stop light circuit is opened to prevent draining of the battery; a switch in the starter solenoid circuit is opened to prevent starting of the engine; and a switch in a tilt switch alarm circuit is closed so that tilting of the car for towing or wheel removal sets off the alarm such as the auto horn or a separate siren.

10 Claims, 2 Drawing Figures

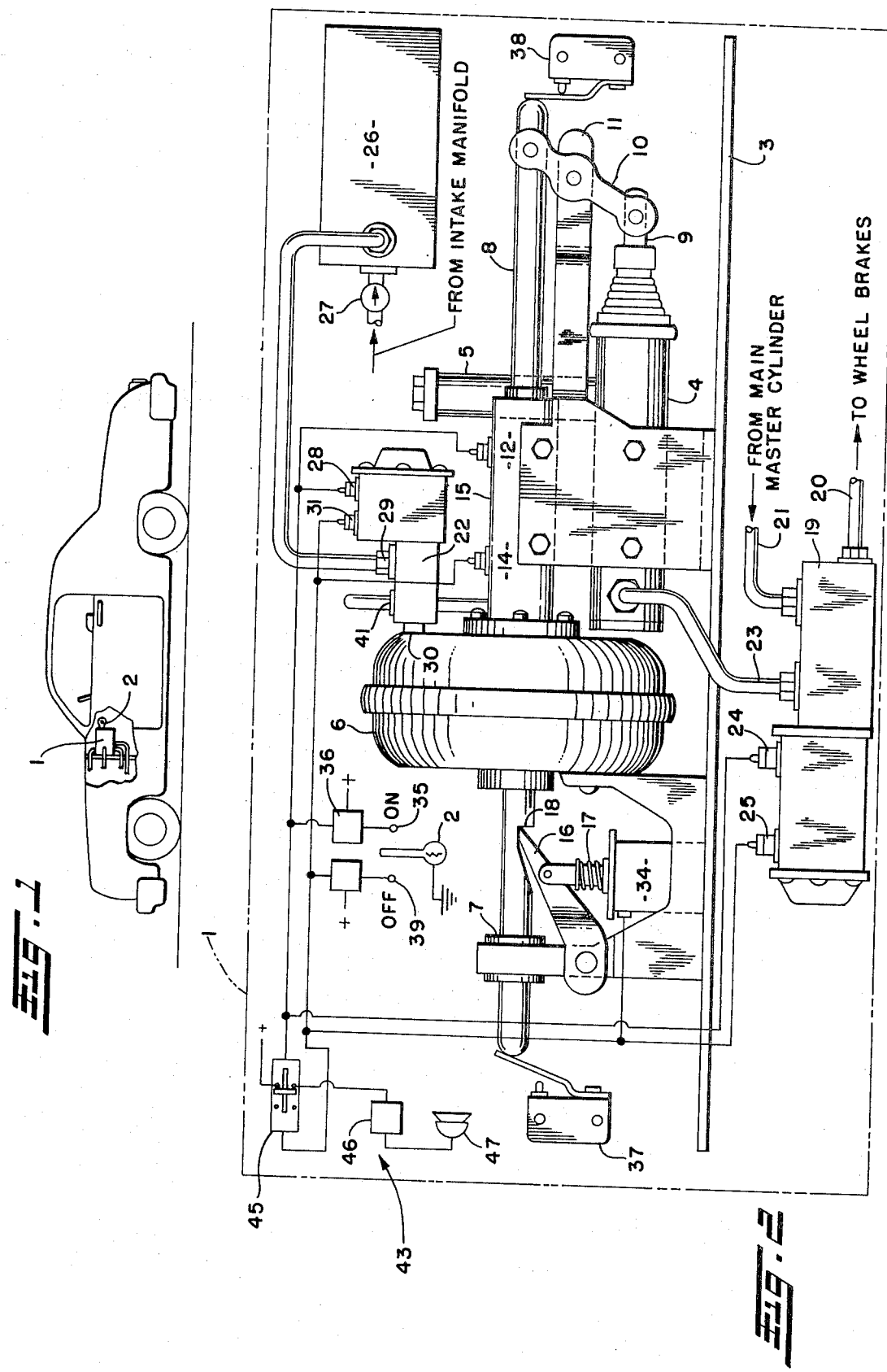

AUTO ANTI-THEFT SYSTEM

BACKGROUND OF THE INVENTION

In view of the continual increase year-after-year in the number of car thefts, the provision of ignition-steering wheel locks on late model cars apparently is no serious obstacle to the knowledgeable car thief. Aside from ignition-steering wheel locks known anti-theft systems generally comprise an audible alarm system which is activated by a key operated switch in such manner as to set off the alarm upon opening of any of the car doors, the hood, or the trunk lid. Other anti-theft devices which are known are so-called "auto paralyzers" which are believed to involve the use of combination locks in the electrical system to prevent starting of the engine unless the correct combination is set on the lock. Yet another known anti-theft device involves installation in the horn circuit a vibration or motion sensing switch which repeatedly sounds the horn several times per second when the car is in motion unless the alarm system is first shut off by a concealed or key-operated switch, such sensing switch also operating for a few seconds time as by motion caused by jacking up of the car for wheel removal.

Although cars equipped with alarm systems or paralyzers of the character indicated may be stolen less frequently than cars not so equipped, it is apparently a relatively simple matter for the professional car thief to quickly disable the alarm system or the paralyzer. Furthermore, cars whether equipped with anti-theft systems or not may be stolen by towing them away from their parking spaces in shopping center parking lots or from the street and if need be the cars may be broken into to shift the transmission lever to neutral position and/or to release the emergency brake.

SUMMARY OF THE INVENTION

It is a principal object of the present invention to provide an anti-theft system or unit which, when actuated to On position by a key operated lock switch, applies the brakes until the key is reinserted and operated to actuate the unit to Off position to release the brakes. Hence, when the system is in its On position, the car cannot be towed away nor can it be driven away even if somehow the engine is started.

It is another object of this invention to provide an anti-theft system in which the components of the brake applying and releasing mechanism are contained within a tamperproof enclosure or are built into the car so as to be inaccessible for tampering.

It is another object of this invention to provide an anti-theft system which essentially comprises an auxiliary master cylinder and an actuator therefor, a main control valve to selectively communicate the auxiliary master cylinder or the main master cylinder with the brake line leading to the wheel cylinders, and a key operated lock switch for actuating the auxiliary master cylinder and main control valve for applying and releasing the brakes in the respective On and Off positions of the system as controlled by the key operated lock switch.

It is yet another object of this invention to provide an anti-theft system which, when set in its On position to apply the brakes, has latch means to retain the brakes in applied position until such time that the latch means is released by a key operated lock switch which sets the system in its Off position.

It is yet another object of this invention to provide an anti-theft system which locks the car against movement by firmly applying the brakes on all four wheels and hence the car cannot be towed or driven away.

It is yet another object of this invention to provide an anti-theft system which not only firmly applies the brakes when it is in its On position but additionally opens a switch in the stop light circuit to prevent battery drain, opens a switch in the starter solenoid circuit to prevent starting of the engine, and closes a switch in a tilt switch alarm circuit to set off the alarm upon tilting of the car for towing or wheel removal.

BRIEF DESCRIPTION OF THE DRAWING

FIG. 1 is a side elevation view of a typical automobile partly broken away to show the anti-theft system herein in a tamperproof enclosure installed or built in to the car body between the fire wall and the dashboard so as to be relatively inaccessible for tampering therewith; and FIG. 2 is a side elevation view of the internal construction of the system, the electrical components being shown schematically.

DETAIL DESCRIPTION OF THE DRAWING

Referring first to FIG. 1, the anti-theft system herein comprises a box-like enclosure 1 as of heavy guage sheet metal which may be built into the car body or which may be installed separately therein so as to be inaccessible for tampering therewith. Provision is made for securing within the enclosure vacuum, electrical, and brake system lines which preferably are appropriately concealed or armored. The enclosure 1 or instrument panel will be provided with a key-operated pick proof lock switch 2 such as a seven tumbler barrel lock.

As shown in FIG. 2 the enclosure 1 has therewithin a base structure 3 which has secured thereto an auxiliary master cylinder 4 having a brake fluid reservoir 5 associated therewith. Also secured to the base structure 3 is a vacuum booster unit 6. The base structure 3 is provided with a bearing 7 in which the actuator rod 8 is reciprocable to reciprocate the piston 9 in the auxiliary master cylinder 4 as by a link 10 which is pivotally mounted on an extension 11 of the base structure 3, the intermediate portion of the rod 8 being connected to the diaphragm piston of the vacuum booster unit 6 and the adjacent portion of the rod 8 constitutes a solenoid armature which is effective to move the rod 8 to the right or to the left upon energization of the respective solenoids 12 and 14, the solenoids 12 and 14 being contained within a housing 15 secured to the housing of the vacuum booster unit 6.

The base structure 3 also has pivotally mounted thereon a latch member 16 which is moved to a locking position by the spring 17 when the actuating rod 8 is moved to the right to brake applying position. At that time, a notch 18 in the rod 8 is positioned so that the spring 17 may urge the end of the latch member 16 into engagement with the notch 18 to prevent left hand brake release movement of the actuating rod 8.

Within the enclosure 1 is a main control valve 19 which preferably is in the form of a reciprocating slide valve having three ports respectively connected to the brake line 20 leading to the wheel brakes, to a pressure line 21 from the main master cylinder, and to the pressure line 23 of the auxiliary master cylinder 4.

The main control valve 19 is a solenoid operated distributor valve in which, when the solenoid 24 is energized, the slide valve member therein is in position to communicate the auxiliary master cylinder line 23 with the brake line 20 whereby the brakes are applied and remain applied so long as the latch member 16 is engaged in the notch 18. When the other solenoid 25 is energized, the valve member shifts to its other position closing communication between the auxiliary master cylinder line 23 and brake line 20 and opening communication between the main master cylinder and brake lines 21 and 20 so that the brake system may be operated in its normal manner to apply or release the brakes.

The enclosure 1 has therein a vacuum tank 26 which may be connected to the engine manifold via the check valve 27. Mounted on the vacuum booster unit 6 is a vacuum control valve 22 which is a two position solenoid valve arranged so that when the solenoid 28 thereof is energized the vacuum and booster ports 29 and 30 are communicated with each other so that suction in the vacuum booster unit 6 draws the piston diaphragm toward the right to assist the solenoid 12 in moving the actuating rod 8 toward the right, and when the solenoid 31 is energized, the valve member is shifted therein to communicate the booster port 30 with the vent port 32 and to close the suction port 29 so that the actuating rod 8 may be pulled to the left by the energization of the solenoid 14 upon disengagement of the latch member 16 from the notch 18 by energization of the solenoid 34.

When the key is inserted into or removed from the lock switch 2, the contacts are in the position shown and when it is desired to turn the system to On position, the contact 35 is momentarily closed by turning of the key and switch to energize the activating relay 36 which energizes the solenoids 28, 12 and 24, simultaneously to effect the following actions, namely, to shift the vacuum control valve 22 to communicate the booster port 30 with the vacuum tank 26, to actuate the actuating rod 8 from left to right with the assistance of the vacuum in the vacuum booster unit 6, and to shift the main control valve 19 to establish communication between the auxiliary master cylinder 4 and the brake line 20. Such actuation of the main control valve 19 by the solenoid 24 closes communication between the main master cylinder and the brake line 20. The movement of the actuating rod 8 to the right displaces brake fluid from the auxiliary master cylinder 4 to the wheel brakes under sufficient pressure to firmly apply the brakes. When the brakes are in applied position, the latch member 16 is urged by the spring 17 into engagement with the notch 18 to hold the brakes in applied position despite the return of the key switch 2 to its neutral position opening the contact 35.

When the actuating rod is in brake applying position as shown, the switch 37 in the stop light circuit is opened so that there will be no drain on the battery when the system is in its On position. The actuating rod 8 also opens a switch 38 in the starter solenoid circuit so that the car engine cannot be started when the system is in its On position.

When the key is inserted into the lock switch 2 and is momentarily turned to Off position closing the contact 39 the deactivating relay 40 is energized to energize the solenoids 34, 31, 14, and 25 respectively to withdraw the latch member 16 from the notch 18, to actuate the vacuum control valve 22 to communicate the booster unit 6 chamber with the vent port 41, to pull the actuating rod 8 to the left, and to actuate the main control valve 19 to block communication between the auxiliary master cylinder 4 and the brake line 20 and to open communication between the main master cylinder and the brake line 20. Accordingly, momentary turning of the key to the Off position will effect release of the brakes and as evident the closing of the switches 37 and 38 will render the stop light and ignition circuits operative in normal manner.

The system herein has yet another important feature and that is the provision of a tilt or motion alarm circuit. When the key is turned to On position the switch 45 in series with a tilt responsive switch 46 such as a mercury switch activates a horn or siren 47 in said alarm circuit. When the key is turned to Off position the contacts of the switch 45 are opened and hence the tilting or motion of the car will not sound the horn or siren 47. When the system is in its On position with the brakes applied as already explained, jacking up of the car for towing or wheel removal will close the contacts in the tilt sensing switch 46 thus to set off the horn alarm. Of course, if either end of the car is lifted for towing, the contacts in the tilt switch 46 will close to set off the horn alarm but the car cannot be towed so long as the brakes are firmly applied. The car can only be removed by placing it on a flat-bed trailer and to position the car on such trailer without tilting would be an extremely difficult job and would require special hoisting equipment I therefore, particularly point out and distinctly claim as my invention:

1. An anti-theft system for an automobile having a hydraulic brake system including a main master cylinder and actuating means therefor, and a brake line communicating said main master cylinder with the respective wheel brakes; said system comprising an auxiliary master cylinder and power actuating means therefor; valve means in said brake line selectively operative to communicate said main master cylinder or said auxiliary master cylinder with said brake line; key operated lock switch means operative to On position to energize said power actuating means and to actuate said valve means to apply said brakes by fluid under pressure conducted to said brake line from said auxiliary master cylinder via said valve means; and latch means to retain said auxiliary master cylinder in brake applying position until said lock means is actuated to Off position whereat said latch means and power actuating means are actuated to release fluid pressure in said auxiliary master cylinder and brake line and whereat said valve member is actuated to communicate said main master cylinder with said brake line for normal operation of the wheel brakes by the actuating means for said main master cylinder; said lock switch means being effective to momentarily energize solenoids associated with said power actuating means and with said valve means to effect application of the wheel brakes as aforesaid while said latch means retains the system in On position despite deenergization of said solenoids when the key is moved away from On position for removal from the lock switch.

2. The system of claim 1 wherein a switch in the stop light circuit is opened by said power actuating means upon movement thereof to brake applying position responsive to actuation of the system to On position thus to prevent battery drain.

3. The system of claim 1 wherein a switch in the starter solenoid circuit is opened by said power actuating means upon movement thereof to brake applying position responsive to actuation of the system to On position to prevent engine starting except when the system is in Off position at which time said switch is closed.

4. The system of claim 1 wherein a tilt switch alarm circuit is activated by said lock switch means in response to actuation of the system to On position whereby tilting of the automobile for towing or wheel removal sets off the alarm.

5. The system of claim 1 wherein a vacuum booster unit is operatively connected to said power actuating means, and a vacuum control valve means is actuated by said lock switch means when the system is in its On position to establish communication between said vacuum booster unit and a vacuum source to assist in movement of said power actuating means to brake applying position.

6. The system of claim 5 wherein said vacuum control valve means is actuated by said lock switch means to vent said vacuum booster unit in response to actuation of the system to Off position.

7. The system of claim 1 wherein said system when actuated to On position moves said power actuating means to brake applying position, said power actuating means being operative to open switches to deactivate the stop light and starter solenoid circuits.

8. The system of claim 7 wherein a tilt switch alarm circuit is activated by said lock switch means responsive to actuation of the system to On position whereby tilting of the car for towing or wheel removal will set off the alarm.

9. An anti-theft system for an automobile having a hydraulic brake system including a main master cylinder and actuating means therefor and a brake line communicating said main master cylinder with the wheel brakes; said system comprising a tamper-proof enclosure containing an auxiliary master cylinder and a solenoid operated actuating means therefor; a solenoid operated distributor valve means in said brake line selectively operative to communicate said main master cylinder or said auxiliary master cylinder with said brake line; key operated lock switch means operable to On position to energize the solenoids of said solenoid operated actuating means and said valve means to apply the brakes by fluid under pressure conducted to said brake line from said auxiliary master cylinder via said valve means; and a spring biased latch member movable into a notch in said solenoid operated actuating means to retain the latter in brake applying position despite deenergization of said solenoids and until said lock switch means is actuated to Off position whereat said solenoids are energized to move said solenoid operated actuating means in the opposite direction to release fluid pressure in said auxiliary master cylinder and brake line and whereat said valve means is actuated to communicate said main master cylinder with said brake line for normal operation of the brakes by the main master cylinder actuating means; said latch means also being solenoid operated responsive to operation of said lock switch to Off position to withdraw said latch member from said notch to permit brake releasing movement of said solenoid operated actuating means; said solenoid operated actuating means, latch member, and valve means remaining in the last mentioned positions despite deenergization of the solenoids by turning of the key away from Off position for removal.

10. The system of claim 9 wherein a vacuum booster unit is operatively connected to said solenoid operated actuating means; and wherein a solenoid operated vacuum control valve alternately communicates said vacuum booster unit with a vacuum source or vents the same when the system is actuated to its On or Off positions; said vacuum booster unit when communicated with the vacuum source being operative to assist in the movement of said solenoid operated actuating means to brake applying position for firm application of the brakes.

* * * * *